March 18, 1924.  E. D. PRATT  1,487,179
SYSTEM OF FOOD SERVICE
Filed Dec. 15, 1920   5 Sheets-Sheet 1
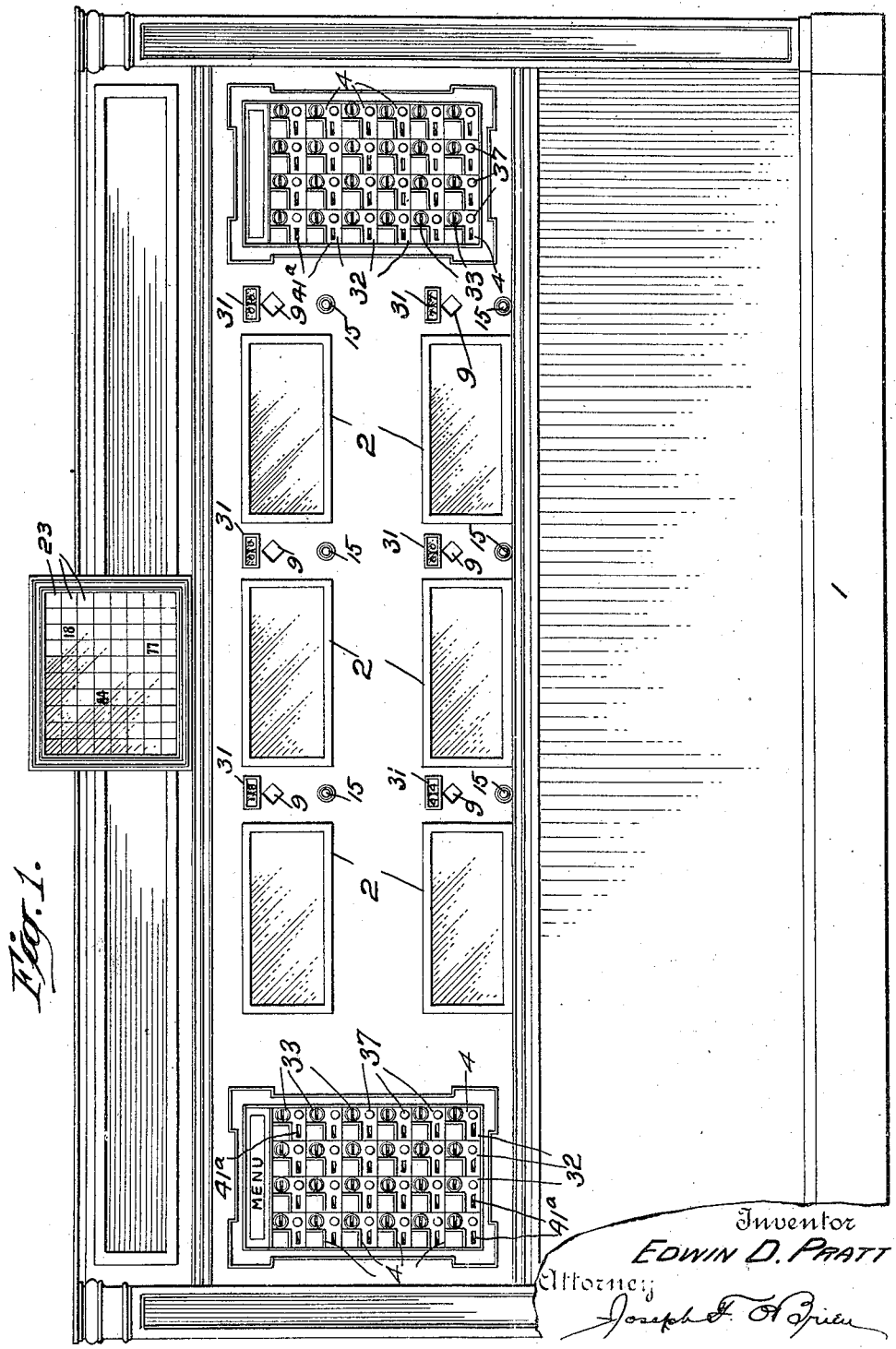
Inventor
EDWIN D. PRATT
Attorney
Joseph F. O'Brien

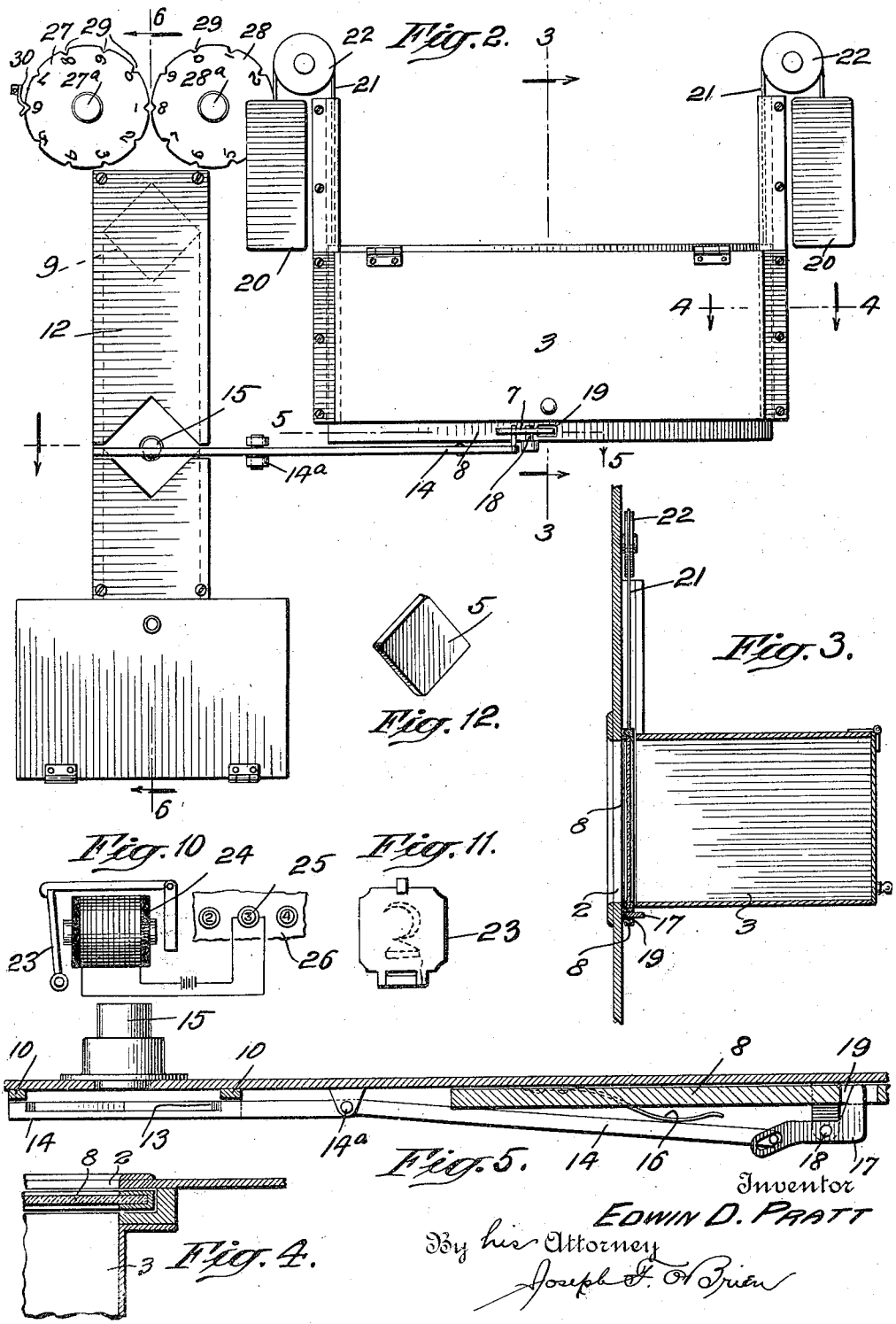

March 18, 1924.
E. D. PRATT
SYSTEM OF FOOD SERVICE
Filed Dec. 15, 1920
1,487,179
5 Sheets-Sheet 3
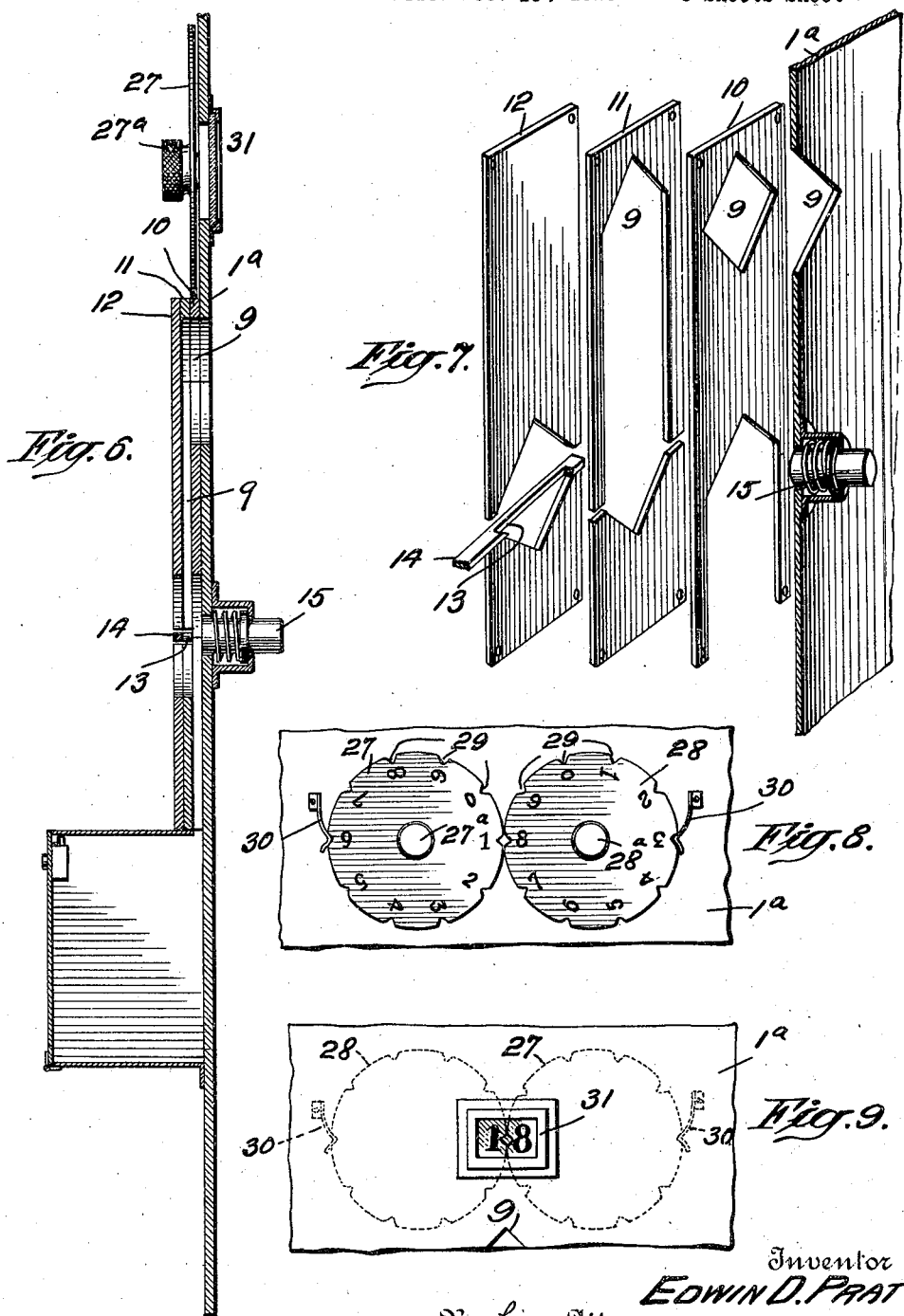
Inventor
EDWIN D. PRATT
By his Attorney
Joseph F. O'Brien March 18, 1924.
E. D. PRATT
1,487,179
SYSTEM OF FOOD SERVICE
Filed Dec. 15, 1920    5 Sheets-Sheet 4
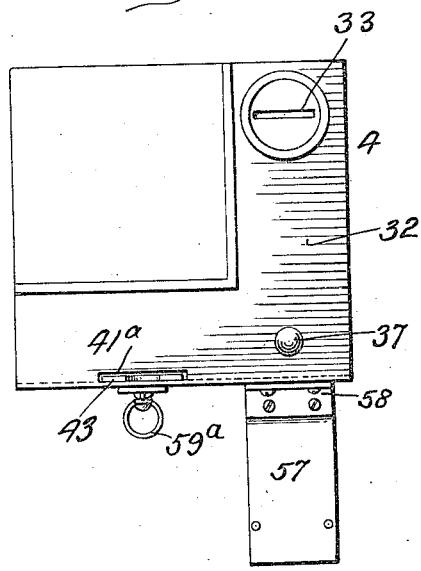
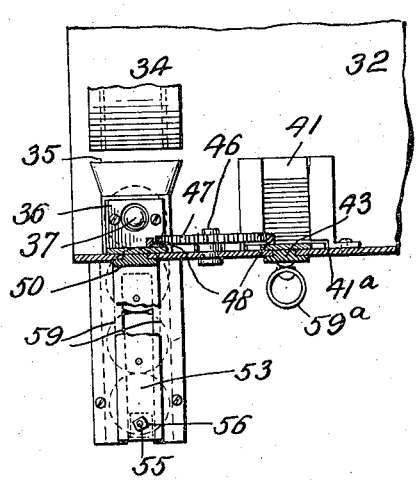
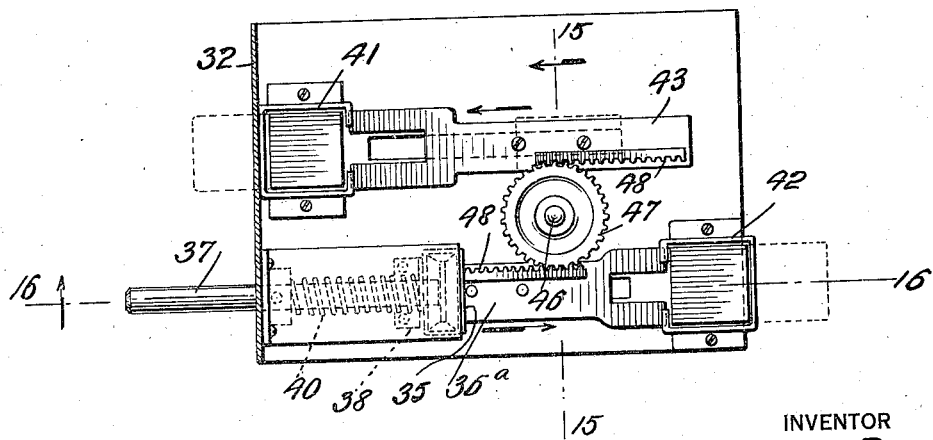
INVENTOR
EDWIN D. PRATT
BY
Joseph F. O'Brien
ATTORNEY

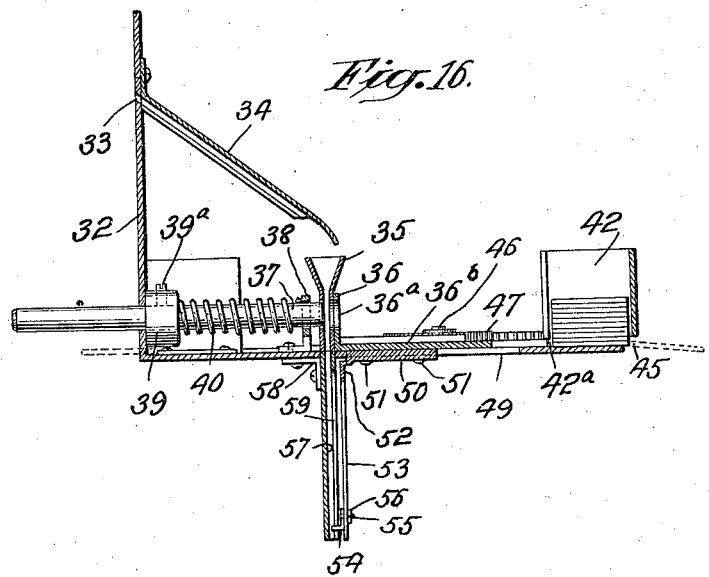

Patented Mar. 18, 1924.

1,487,179

UNITED STATES PATENT OFFICE.

EDWIN D. PRATT, OF NEW YORK, N. Y.

SYSTEM OF FOOD SERVICE.

Application filed December 15, 1920. Serial No. 430,828.

*To all whom it may concern:*

Be it known that I, EDWIN D. PRATT, a citizen of the United States, and a resident of the borough of Manhattan, city, county, and State of New York, have invented certain new and useful Improvements in Systems of Food Service, of which the following is a specification.

This invention relates to improvements in systems of food service.

One of the objects of this invention is to provide for the service of prepared food orders to a customer without confusion, unnecessary delay or crowding about the point of delivery of the food by customers, and preferably also without any talking or shouting either by the customer or by the chef at any time.

Another object of my invention is to provide means for causing the delivery to a customer of an identifying check for an order selected by him and at the same time to cause the delivery of a similar order-identifying check to the chef and also to provide means whereby the chef may indicate or announce to the customer, who may be located at a distance from the chef or the place where the food is to be delivered, that the order by said duplicate checks is ready and has been delivered into a suitable food compartment, and preferably to indicate the particular one of a series of such food compartments into which the article of food represented by such identifying checks has been delivered.

Another object of my invention is the provision in a single suitable partition or frame, which preferably separates a dining room from a kitchen or the like, of one or more food delivery compartments and preferably a series of such compartments; an apparatus preferably embodying a series of duplicate check mechanisms, by each of which duplicate checks are delivered one to a prospective purchaser and the other to a chef, the apparatus preferably being operated by the insertion or deposit by the customer through a slot in the apparatus of one or more coins corresponding to the indicated purchase-price of the order; annunciator mechanism operable by the chef from the rear of the partition or frame to announce to the customer that the order identified by such duplicate checks is deposited in a food compartment; and also preferably to provide means for indicating or announcing to the customer the particular compartment of a series of such compartments into which the identified order of food has been deposited, access to which compartment is preferably to be had by the insertion of the customer's check into a slot associated with suitable door operating mechanism.

In the preferred embodiment of my invention a suitable dividing-partition or frame is provided with a series of food compartments each of which has a door having locking mechanism releasable by the insertion in a slot associated therewith of a duplicate order-identifying check; one or more duplicate check machines, each comprising a series of duplicate check mechanisms operable by the insertion through an associated slot of an indicated sum of money, to deliver duplicate checks, one to the rear of the machine to a chef and the other to the front of the machine to a prospective purchaser, each of which checks identifies by number or other suitable indicia the particular order of food selected; an annunciator mechanism preferably located in said frame above the food compartments and duplicate check machines, which annunciator mechanism is operable by the chef from the rear of the partition or frame to announce to the customer, who may be seated in the dining room at a distance from the partition or frame, that the order identified by his check is prepared and has been delivered to a food compartment, and I also preferably provide in said partition or frame, a series of indicating devices, each positioned adjacent to a food compartment for indicating to the customer the particular food compartment of the series into which the order of food so identified as aforesaid has been deposited.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a front elevation of a dividing-partition or frame embodying my invention;

Fig. 2 is a rear elevation of one of the food compartments embodied in said partition or frame illustrated in Fig. 1 and the operating mechanism therefor;

Fig. 3 is a section on the line 3—3 of Fig. 2;

Fig. 4 is a fragmentary section on the line 4—4 of Fig. 2;

Fig. 5 is an enlarged section on the line 5—5 of Fig. 2;

Fig. 6 is a section on the line 6—6 of Fig. 2;

Fig. 7 is a view in perspective of the disassembled plates forming the check slot shown in Fig. 6;

Fig. 8 is a rear view of the mechanism for identifying the particular food compartment;

Fig. 9 is a front view of the indicating mechanism shown in Fig. 8;

Fig. 10 is a detail plan of annunciator mechanism suitable for use in my invention;

Fig. 11 is a drop of such annunciator mechanism;

Fig. 12 is a form of identifying check preferably employed by me;

Fig. 13 is an enlarged front elevation of a single check and coin slot for a duplicate check mechanism;

Fig. 14 is a top plan view of such a duplicate check mechanism;

Fig. 15 is a central sectional view on the line 15—15 of Fig. 14;

Fig. 16 is a sectional view on the line 16—16 of Fig. 14; and

Fig. 17 is a bottom plan view of one of such duplicate check mechanisms.

Referring now to these drawings, 1 indicates the frame of a machine which serves as a dividing partition between a dining room and a kitchen or other place where food is prepared or stored. Said partition is provided with food apertures 2 extending through the partition and, as shown, a series of these apertures are provided, each having a food compartment 3 registering therewith and provided with front and rear doors to permit access thereto from the rear by the chef or other employee and from the front by a customer.

In accordance with my system of food service, there is also preferably mounted in the said partition a series of duplicate check mechanisms 4, two groups of these mechanisms being shown on opposite sides of the food compartments 3. Associated with each of these mechanisms or posted or displayed on the front plate thereof is preferably the name of an article or dish of food with the price thereof and each mechanism also preferably has associated therewith a slot into which may be inserted by a customer the price in coins or the like of the article or dish of food selected by him and cooperating with said slot is a plunger 37 or like device which upon operation after insertion of the designated number of coins or the like will cause to be delivered duplicate checks 5, one to the customer at the front of the machine and the other to the chef at the rear thereof. Each of these duplicate checks 5 will identify the article of food or dish selected by the customer. The chef being thus apprised of the article or dish of food ordered, the customer may take a seat in the dining room at any suitable place which may be remote from the aforesaid partition or food compartments. When the article or dish of food is prepared, the chef places the same in one of the food compartments 3, and then by operating annunciator mechanism 6 announces or makes known to the customer that the article of food ordered by him has been prepared and is in one of the food compartments. There is thus no necessity of crowding by customers about the point of delivery of the food while waiting for the same to be prepared.

The chef also preferably indicates by a suitable supplementary indicating device having a framed display opening 31, one of which devices is preferably associated with each food compartment, the particular food compartment into which the food so prepared has been delivered. Each of these compartments is preferably provided as aforesaid with a sliding door which is releasable by the deposit in a slot, preferably associated with the food compartment, of the duplicate check held as aforesaid by the customer.

In some cases, it is desirable to provide means for enabling a customer, if he so desires, to vary his order from the list of articles included on menus posted on the double check mechanism, and for this purpose, the customer may communicate his order to a cashier who will then issue duplicate order-identifying checks, one to the customer and the other to the chef, after which the chef will prepare the food, deliver the same to a food compartment and announce the delivery thereof by annunciator mechanism as hereinabove described.

Any suitable form of apparatus may be employed to carry out the steps in my said system and as shown each food compartment 3 has a front door 8 which is releasably locked by mechanism operable by the deposit of one of the duplicate checks 5 in a slot 9 which is formed at the rear of the partition by three guide plates 10, 11 and 12, each forming portions of the slot and adapted when in proper position to guide the customer's check 5 into a notch seat 13 in one end of a lever 14, which seat is in alignment with a plunger 15 mounted in the face plate 1ª of the partition, whereby an inward push on the plunger 15 will press the check against the lever 14 which is rocked on its pivot 14ª against the action of the flat spring 16 and has a slot and pin connection at its opposite end with a pivoted latch 17 pivoted at 18, the nose of which normally is held in latching position in a seat 19 in the door by the action of said flat spring 16 acting through the lever 14. The front door 8 is preferably opened automatically upon the disengaging of the latch 17 and, as illustrated, the automatic opening of the door is accomplished by the use of weights 20 which are suspended on ropes 21 led over pulleys 22 and connected to the opposite edges of the said door.

The latch 17 therefore retains the door in closed and locked position and so soon as the nose of said latch is withdrawn the door will by the operation of the weights 20 be automatically opened and remain open until subsequently closed, which closing may be accomplished by hand or any other suitable way desired.

My preferred form of annunciator mechanism is provided with a large number of drops 23 which are controlled by magnets 24 in any well known manner, having in circuit suitable push buttons 25 or other devices mounted upon an operating board 26.

My preferred form of means for indicating the particular food compartment preferably comprises two discs 27—28 mounted to rotate with the circumferential edges adjacent to each other and operable so to rotate by handles 27ª—28ª. These discs are preferably provided at their edges with notches 29 which cooperate with springs 30 to retain the discs in any suitable position. These discs are preferably provided on their opposite faces with corresponding numerals and a framed opening 31 in the front face plate permits the exposure of the numerals on the front side thereof, the arrangement being such that the manipulation and variable rotation of the discs may expose a number from 1 to 99 or if desired a greater number may, of course, be exposed by changing the numeric indications on the disc.

Each double check mechanism 4 comprises a casing or front wall portion 32 with a coin slot 33 therein, from which leads a coin chute 34 having an exit end directly over the upper flaring top of the hopper 35, which is fastened to the upturned portion 36 of the slide 36ᵇ. The walls of said hopper beneath its upper flaring end, and also the end 36 of the slide, are provided with registering apertures 36ª for the reception of the push rod 37, which is mounted in registering apertures in the vertical wall of the casing 32 and in the guide bracket 38 fastened to the bottom of the casing. A collar 39 is fastened by a set screw 39ª to said rod, and 40 designates a coiled spring interposed between the guide bracket and said collar and serves to normally return the rod to its outer limit after having been pushed inward in the act of operating the double check delivery mechanism.

Mounted upon the bottom of the casing are stacks 41 and 42, the inner faces of which are recessed, as at 41ª—42ª, respectively, to receive the two forked ends of the two slides 43 and 36ᵇ. An exit slot 44 is formed in the bottom of the stack 41 and a similar exit slot 45 is formed in the bottom of the stack 42. Midway between the two slots is mounted a stationary post 46, upon which a pinion wheel 47 is journaled, and upon the upper surface of each shank portion of the slides are rack teeth 48, which are in engagement with the teeth of the pinion wheel. The bottom of the frame is provided with elongated slots 49, and 50 designates a plate, movable within one of said slots, which has flanges bearing against the under surface of the frame and which are held to the plate 36ᵇ through the medium of the screws 51. Said plate 50 as shown clearly in Fig. 16 of the drawings, has a downwardly projecting portion 52, having an elongated slot 53 therein, and 54 is an L-shaped member, from which a bolt 55 projects through the slot 53 and upon which a nut 56 is mounted and forms means for holding the said member 54 in different vertical positions within the slot 53, according as it may be desired to set the apparatus to receive a different number of coins within the chute 57, which is held to the under surface of the casing by means of the bracket member 58, said chute being in registration with the slot in the lower portion of the hopper member 35.

The chute 57 has a slot 59 formed in one wall thereof in which the laterally projecting portion of the member 54 is guided, as will be noted upon reference to Fig. 17 of the drawings. A coiled spring 59ª is connected at one end to a pin 60 upon the under surface of the casing and its other end to the lug 61, projecting from the shank portion 62 of a flanged guide plate 36ᵇ fastened to the under surface of the slide 43, the purpose of which spring is to normally return the slide 43, after having been moved forward through the medium of the push rod, and with it the slide 36ᵇ will return to its normal position.

In operation, piles of checks of similar denominations are placed within the two stacks 41 and 42, and when it is desired to dispense simultaneously a check from the bottom of each pile, the operator drops in the required number of coins into the slot 33 and which coins will pass through the chute 34 into the hopper 35 and thence into the chute 57, the first coin introduced falling by gravity upon the adjustable L-shaped member 54, it being noted that the said member will be adjusted to regulate the number of coins which may be held within the chute 57. In Fig. 15 of the drawings, the member 54 is adjusted at its lowest limit which will require four coins, superimposed one upon the other, indicated in dotted lines, to permit the apparatus to be operated when the rod 37 is pushed into the casing. When the rod 37 is pushed in, the inner end thereof contacts with the uppermost of the series of coins, pushing the same against the wall of the apertured portion of the hopper 35, to which the slide 36<sup>b</sup> is fastened, and the latter will be moved with the hopper, causing the gear wheel 47 to rotate, which in turn will throw the slide 43 in the opposite direction.

As the slide 36<sup>b</sup> moves forward, it will push the check at the bottom of the pile in the stack 42 through the recess 45, shown in Fig. 16 of the drawings, and will deliver the same to the chef. The slide 43, moving in the opposite direction, will push out the bottom check in the stack 41, as shown in dotted lines in Figs. 14 and 16 of the drawings, and which is to be retained by the purchaser. As the slide 36<sup>b</sup> is pushed forward by the rod 37, the downwardly projecting portion 52 of the plate 50, which is attached thereto, and which projection carries the L-shaped member 54, will withdraw from underneath the coins permitting the latter, with the exception of the one which is being pushed forward by the rod 37, to fall from the chute 57.

When the pressure is released from the rod 37, the spring 40 will return the latter to its normal position and the slides will be returned to their normal starting positions through the medium of the spring 59<sup>a</sup>. When the coin in front of the rod is pushed back by the hopper in which it is mounted to the starting position of the latter, the coin will fall down into the chute 57 and be caught by the member 54.

Having described my invention, I claim:—

1. A system of food service embodying food-delivery means, duplicate checks identifiable with a single order of food, one of which is delivered at the front of said food delivery means and the other at the rear thereof and annunciator mechanism operable from the rear of said delivery means and arranged to announce at the front thereof that the order of food corresponding to the duplicate checks has been delivered to said food-delivery means.

2. A system of food service embodying a dividing partition provided with a food-delivery aperture for delivering food through said partition, duplicate checks identifiable with a single order of food, one of which is delivered at the front of said partition and the other at the rear thereof and annunciator mechanism operable from the rear of said partition and arranged to announce at the front thereof that the order of food corresponding to the duplicate checks has been delivered to said food-delivery aperture.

3. A system of food service embodying a dividing partition provided with a food-delivery aperture for delivering food through said partition, duplicate checks adapted to identify a single food order selected by a customer, mechanism for causing the delivery of one of such checks at the front of said dividing partition and the other at the opposite side of said partition, and annunciator mechanism operable from the rear of said partition and arranged to announce at the front thereof that the order of food corresponding to the duplicate checks has been delivered to said food-delivery aperture.

4. A system of food service embodying a dividing partition provided with a plurality of food compartments for delivering food through said partition, duplicate checks adapted to identify a single food order selected by a customer, mechanism for causing the delivery of one of such checks at the front of said dividing partition and the other at the opposite side of said partition, annunciator mechanism operable from the rear of said partition and arranged to announce at the front thereof that the order of food corresponding to the duplicate checks has been delivered through one of said food compartments, and indicating means for indicating the particular compartment into which the identified order has been delivered.

5. A system of food service embodying a dividing partition provided with a plurality of food compartments for delivering food through said partition, a series of checks of varying denominations having duplicates adapted to identify a single food order selected by a customer, a series of mechanisms each adapted to cause the delivery of one identifying check at the front of said dividing partition and its duplicate at the opposite side of said partition, annunciator mechanism operable from the rear of said partition and arranged to announce at the front thereof that the order of food corresponding to the duplicate checks has been delivered through one of said food compartments.

6. A system of food service embodying a dividing partition provided with a plurality of food compartments for delivering food through said partition, a series of checks of varying denominations having duplicates adapted to identify a single food order selected by a customer, a series of mechanisms each adapted to cause the delivery of one identifying check at the front of said dividing partition and its duplicate at the opposite side of said partition, annunciator mechanism operable from the rear of said partition and arranged to announce at the front thereof that the order of food corresponding to the duplicate checks has been delivered through one of said food compartments and means positioned adjacent to each food compartment adapted to show indicia corresponding to said identifying checks to indicate the particular food compartment into which the identified order has been delivered.

7. A system of food service embodying a casing, duplicate checks mounted within said casing; coin-actuated mechanism adapted to deliver duplicate checks, one to the rear of said casing and another to the front side thereof, a food compartment having a door releasable by the check delivered at the front of the machine and annunciator mechanism operable at the rear of the casing to announce at the front of the casing that the order of food corresponding to the duplicate checks is within said receptacle.

8. The system of food service which includes a casing having duplicate checks indicating a single order of food to be purchased, mechanism for the simultaneous delivery from said casing of one of such checks to a chef and the other to a purchaser, a food compartment having at the front side a door releasable by the purchaser's check and at the rear side an opening for the insertion by the chef of the order of food selected by the purchaser; an annunciator mechanism for indicating that the order of food corresponding to the customer's check is in the receptacle and means for enabling the release by the purchaser with one of said duplicate checks of the door of said food receptacle.

9. A system of food service embodying a casing, duplicate checks mounted within said casing; coin-actuated mechanism adapted to deliver duplicate checks, one to the rear of said casing and another to the front side thereof, a plurality of food compartments each having a door releasable by the check delivered at the front of the machine and annunciator mechanism operable at the rear of the casing to announce at the front of the casing that the order of food corresponding to the duplicate checks is within one of said receptacles and indicating means for indicating the particular compartment into which the identified order has been delivered.

10. The system of food service which includes means for identifying a plurality of checks with a single order of food, means for delivering simultaneously one of such checks to a chef and the other to a purchaser, means for delivering by the chef of the order of food identified with such checks; and annunciator mechanism for indicating that the order of food corresponding to the checks has been delivered.

11. The system of food service which includes a casing having duplicate checks arranged in series and each pair of duplicate checks indicating a single order of food to be purchased, mechanism for the simultaneous delivery from said casing of one of such checks to a chef and the other to a purchaser, a series of food compartments each having a door releasable by a purchaser's check and each provided with an opening for the insertion by the chef of the order of food selected by the purchaser; and annunciator mechanism for indicating that the order of food corresponding to the customer's check is in one of the receptacles, and means for enabling the purchaser to release with the check delivered to him the door of said food receptacle.

12. The system of food service which includes a casing having duplicate checks arranged in series and each pair of duplicate checks indicating a single order of food to be purchased, mechanism for the simultaneous delivery from said casing of one of such checks to a chef and the other to a purchaser, a series of food compartments each having a door releasable by a purchaser's check and each provided with an opening for the insertion by the chef of the order of food selected by the purchaser; annunciator mechanism for indicating that the order of food corresponding to the customer's check is in one of the receptacles, means for indicating the particular receptacle of the series into which the food has been deposited and means for enabling the purchaser to release with the check delivered to him the door of said indicated food receptacle.

In witness whereof, I have signed my name to the foregoing specification in the presence of two subscribing witnesses.

EDWIN D. PRATT.

Witnesses:
HELEN V. WHIDDEN,
FREDERICK P. RANDOLPH.